(12) United States Patent
Yamaguchi

(10) Patent No.: US 6,897,911 B2
(45) Date of Patent: May 24, 2005

(54) LIGHT DIFFUSING PLATE, LIQUID CRYSTAL DISPLAY APPARATUS AND REAR PROJECTION APPARATUS

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 81 days.

(21) Appl. No.: 09/782,199

(22) Filed: Feb. 14, 2001

(65) Prior Publication Data

US 2001/0015780 A1 Aug. 23, 2001

(30) Foreign Application Priority Data

Feb. 14, 2000 (JP) ........................................ 2000-034845
Feb. 14, 2000 (JP) ........................................ 2000-035130

(51) Int. Cl.⁷ ........................ G02F 1/1335; G02B 27/10
(52) U.S. Cl. ........................... 349/57; 349/61; 349/95; 359/619; 359/620
(58) Field of Search .......................... 349/57, 61, 95; 359/619, 620

(56) References Cited

U.S. PATENT DOCUMENTS 5,369,544 A    11/1994  Mastrangelo ............ 361/283.4
5,946,100 A  *  8/1999  Ishibara ....................... 356/376
6,231,200 B1 *  5/2001  Shinohara et al. ............ 362/31
2001/0019378 A1  9/2001  Yamaguchi

* cited by examiner

*Primary Examiner*—Tarifur R. Chowdhury
*Assistant Examiner*—Hoan C. Nguyen
(74) *Attorney, Agent, or Firm*—Sughrue Mion, PLLC

(57) ABSTRACT

The light diffusing plate includes a lens substrate, a plurality of microlenses disposed on a surface of the lens substrate, a plurality of light exit areas, each having a circular or rectangular form a center of which is coincident with an optical axis of the microlens, and a light shield layer formed on another surface of the lens substrate, and covering other area than the light exit areas. When n and t are a refractive index and a thickness of the lens substrate, respectively, and C (R; diameter, A, B; sides of rectangle) is a size of light exit area, a size of the microlens Sr satisfies the following formula in the light diffusing plate: $Sr \geq 2t \times \tan\theta + C$ (with the proviso that $\theta = \sin^{-1}(1/n)$). Or, a form of the microlens in the light diffusing plate is a part of an ellipsoid shown in the following formula $X^2/a^2 + y^2/a^2 + z^2/c^2 = 1$ (x and y represent axis on the surface of the lens substrate, z represents the optical axis), it's eccentricity $\epsilon$ is shown in the following formula $\epsilon = (c^2 - a^2)^{1/2}/c = 1/n$ and it's far focal point is coincident with a position of the light exit area. The liquid crystal display apparatus and the rear projection apparatus use the light diffusing plate.

10 Claims, 8 Drawing Sheets

LIGHT DIFFUSING PLATE, LIQUID CRYSTAL DISPLAY APPARATUS AND REAR PROJECTION APPARATUS

BACKGROUND OF THE INVENTION

The present invention relates to the technical field of increasing a range of viewing angles in liquid crystal display devices and the like. More particularly, the present invention relates to a light diffusing plate having a high or an excellent light diffusing capability, a liquid crystal display apparatus and a rear projection apparatus which make use of the light diffusing plate.

The opportunity or the frequency of use of liquid crystal displays (LCDs) as a display for word processors and computers is rapidly increasing today. The use of LCDs as a monitor in ultrasonic, CT and MRI diagnostic apparatus is under review. Conventionally, these medical diagnostic apparatus have primarily used CRTs (cathode-ray-tubes) as a monitor.

LCDs have many advantages such as ease in size reduction, small thickness and lightweightness. On the other hand, they have poor viewing angle characteristics (narrow viewing angle) since as the viewing direction or angle changes, the contrast of an image degrades sharply and the gradation also reverses to have the image look differently. As a result, depending on a position of a viewer, the image can not be viewed correctly.

In medical applications described above, diagnosis with monitors is based on the difference in image density, so that not only is it required to produce an image of high contrast ratio but at the same time, incorrect or improper recognition of an image can cause wrong diagnosis or inconsistency in the results of diagnoses. Under these circumstances, it is required that images of high contrast ratio be displayed over a wide range of viewing angles, particularly, in a case that diagnosticians such as a plurality of doctors and the like view a medical diagnostic image. Another problem peculiar to medical monitors is that image is usually displayed in monochrome (black and white colors) and, hence, suffers considerable contrast degradation as the viewing angle varies.

A known method for increasing the viewing angle of LCDs relies upon using a collimated backlight and an image-bearing light that has passed through the liquid crystal display panel is diffused with a light diffusing plate (see Japanese Examined Patent Publication No. 7-7162, Unexamined Published Japanese Patent Application No. 6-95099 and the like).

In this method, it is required that the light diffusing plate not only has a satisfactory light diffusing capability but also can effectively diffuse the collimated light which has passed through the liquid crystal display panel in order to perform a high contrast image display over a wide range of viewing angles; however, such light diffusing plate has practically not been fabricated.

In the light diffusing plate used for the purpose of increasing the viewing angle in the LCD, a light shield layer (hereinafter also referred to as black mask) is ordinarily formed in an area other than an optionally-set light exit area thereof to prevent a decrease of visual recognition, an uneven display, a blurred image and the like to be caused by a stray light. On the other hand, in a conventional light diffusing plate, besides the stray light, the image-bearing collimated light which has passed through an appropriate optical path and is incident on the black mask is blocked to some extent.

As a result, the quantity of the light which passes through the light diffusing plate, is diffused and issued, that is, display luminance is decreased thereby causing cases in which the object to increase the viewing angle can not be achieved.

Moreover, in the above-described method in which the collimated light is diffused by the light diffusing plate, the more the light having high luminance and sufficiently diffused is issued, the wider the range of the viewing angles of the LCD becomes. Accordingly, the light diffusing plate used for increasing the viewing angle of the LCD is required to sufficiently diffuse the collimated light incident thereon.

The same problem of viewing angle also applies to a rear projection apparatus.

In the rear projection apparatus, an image-bearing light issued from a rear projection engine is incident on a back surface of a screen to display the image on A front surface thereof. The screen of the rear projection apparatus is ordinarily constituted of a Fresnel lens and a lenticular lens whereupon a diffused light issued from the rear projection engine is changed into a collimated light by the Fresnel lens and the resultant collimated light is diffused by the lenticular lens to display an image.

In this screen, an excellent viewing angle can be obtained in one direction, for example, in a horizontal direction,; however, a sufficient viewing angle can not be obtained in a vertical direction. It goes without saying that an image having a high luminance can preferably be displayed also in the rear projection apparatus making use of the light incident on the screen without wasting it; however, this has not been fully performed in practice.

Therefore, required is the light diffusing plate which can change the collimated light incident thereon into the diffused light which is sufficiently diffused and issue it and, further, have an excellent light diffusing capability; however, such light diffusing plate has not been put in practice.

SUMMARY OF THE INVENTION

The present invention has been accomplished under these circumstances and has as an object providing a light diffusing plate having an excellent light diffusing capability which ensures sufficiently diffusing a collimated light incident thereon, or a light diffusing plate having an excellent light diffusing capability which ensures diffusing a collimated light incident thereon, positively blocking a stray light and, in contrast, issuing the collimated light which has been incident thereon through an appropriate optical path without wasting it and, a liquid crystal display apparatus and a rear projection apparatus which use this light diffusing plate and are capable of displaying an image having a wide range of viewing angles and a high contrast.

In order to attain the object described above, the first aspect of the present invention provides a light diffusing plate comprising: a lens substrate; a plurality of microlenses disposed on a surface of the lens substrate; a plurality of light exit areas, each having a circular form a center of which is coincident with an optical axis of each of the plurality of microlenses; and a light shield layer formed on another surface of the lens substrate reverse to the plurality of microlenses, and covering other area than the plurality of light exit areas, wherein when a refractive index of the lens substrate is represented by n; a thickness of the lens substrate by t; a diameter of each of the plurality of light exit areas by R; and a size of each of the plurality of microlenses by Sr, the following formula is satisfied:

$$Sr \geq 2t \times \tan\theta + R \text{ (with the proviso that } \theta = \sin^{-1}(1/n)\text{)}.$$

Preferably, the plurality of microlenses are either in circular form when viewed from a direction of the optical axis and are arranged in a closest packing state or in hexagonal form when viewed from the direction of the optical axis and are arranged in a hexagonal close-packed state.

In order to attain the object described above, the second aspect of the present invention provides a light diffusing plate comprising: a lens substrate; a plurality of microlenses disposed on a surface of the lens substrate; a plurality of light exit areas each having a rectangular form a center of which is coincident with an optical axis of each of the plurality of microlenses; and a light shield layer formed on another surface of the lens substrate reverse to the plurality of microlenses, and covering other area than the plurality of light exit areas, wherein, when a refractive index of the lens substrate is represented by n; a thickness of the lens substrate by t; a length of a side of each of the plurality of light exit areas by A; a length of another side of each of the plurality of light exit area by B; a size of each of the plurality of microlenses in a direction of the length A represented by Sa; and a size of each of the plurality of microlenses in a direction of the length B represented by Sb, the following formulae are satisfied:

$$Sa > 2t \times \tan\theta + A$$

$$Sb \geq 2t \times \tan\theta + B \text{ (with the proviso that } \theta = \sin^{-1}(1/n))$$

Preferably, the plurality of microlenses are either in square form viewed from a direction of the optical axis and are arranged in a square closed-packed state or in rectangular form viewed from the direction of the optical axis and are arranged in a rectangular closed-packed state.

In order to attain the object described above, the third aspect of the present invention provides a light diffusing plate comprising: a lens substrate; a plurality of microlenses disposed on a surface of the lens substrate; a plurality of light exit areas disposed on another surface of the lens substrate reverse to the plurality of microlenses, and having an optical axis of each of the plurality of microlenses; and a light shield layer formed on the another surface of the lens substrate reverse to the plurality of microlenses, and overing other area than the plurality of light exit areas, wherein a form of each of the plurality of microlenses is a part of an ellipsoid shown in the following formula (1), wherein an accentricity $\epsilon$ of the ellipsoid is shown in the following formula (2) and wherein, in the ellipsoid, a focal point away from a side into which light is launched is coincident with a position of each of the plurality of light exit areas:

$$X^2/a^2 + y^2/a^2 + z^2/c^2 = 1 \quad (1)$$

$$\epsilon = (c^2 - a^2)^{1/2}/c = 1/n \quad (2)$$

wherein x and y represent axis on the surface of the lens substrate; z represents the optical axis; and n represents a refractive index of a material forming the plurality of microlenses.

Preferably, the plurality of microlenses are either in circular form viewed from a direction of the optical axis and are arranged in a closest packing state, or in hexagonal form viewed from the direction of the optical axis and are arranged in a hexagonal close-packed state.

It is preferably that the light diffusing plate according to each of the first, second and third aspects of the present invention further comprises an anti-reflective layer formed on a light exit side, and covering an area other than the plurality of light exit areas.

Preferably, the refractive index of the lens substrate is between 1.4 and 2.

The present invention provides a liquid crystal display apparatus comprising: a liquid crystal display panel; a backlight section for causing a collimated light to be incident on the liquid crystal display panel; and a light diffusing plate according to each of the first, second and third aspects of the present invention which diffuses an image-bearing collimated light which has passed through the liquid crystal display panel.

The present invention provides a rear projection apparatus comprising a rear projection engine for issuing an image-bearing diffused light and a screen on which the image-bearing diffused light is incident and an image of the image-bearing diffused light is displayed, the screen including a Fresnel lens and a light diffusing plate according to each of the first, second and third aspects of the present invention.

DETAILED DESCRIPTION OF THE INVENTION

A light diffusing plate, a liquid crystal display apparatus and a rear projection apparatus according Go the present invention are described below in detail with reference to the preferred embodiments shown in the accompanying drawings.

Figure 1:
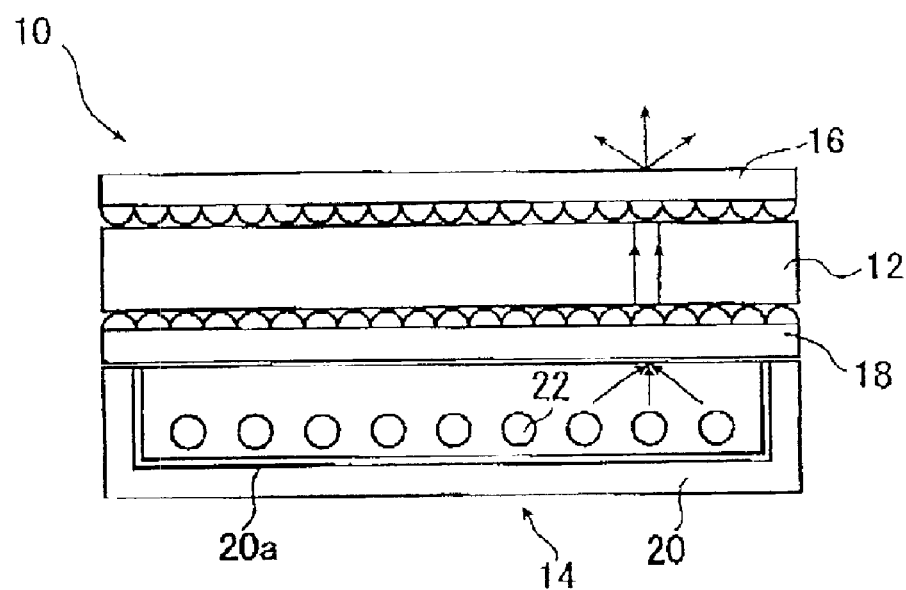
FIG. 1 is a cross sectional view that shows in conceptual form an embodiment of a liquid crystal display apparatus of the present invention.

FIG. 1 shows an embodiment of a liquid crystal display apparatus of the present invention in conceptual form.

The liquid crystal display apparatus (hereinafter referred to as display apparatus) generally indicated by 10 in FIG. 1 is a so-called liquid crystal display (hereunder referred to as LCD) that utilizes a liquid crystal display panel 12 as an image display device. It comprises the liquid crystal display panel 12, a backlight section 14 that causes collimated light (parallel light) to be incident on the liquid crystal display panel 12 and a light diffusing plate 16 of the present invention that diffuses an image-bearing collimated light which has passed through the liquid crystal display panel 12.

In the illustrated case, the liquid crystal display panel 12 is connected to its driver (not shown). The display apparatus 10 of the present invention has an opening for image viewing and is combined with any necessary members that are included in known LCDs, such as a casing that has an image viewing window and which holds the backlight section 14, the liquid crystal display panel 12, the light diffusing plate 16, the above-described driver and other members in position.

This display apparatus 10 is of a transmission type LCD in which, as in the conventional transmission type LCD, the collimated light (collimated backlight) issued from the backlight section 14 is incident on the liquid crystal display panel 12 which is being driven in accordance with a displayed image and, then, as it passes through the panel 12, it becomes an image-bearing collimated backlight which is, subsequently, diffused by the light diffusing plate 16 to cause an image to be displayed.

The backlight section 14 for issuing the collimated light as a backlight for viewing the image displayed on the liquid crystal panel 12 comprises a collimating plate 18, a housing 20 and a light source 22.

The housing 20 is a rectangular enclosure with one side open and, as a preferred embodiment in the backlight section 14, inner surfaces of the housing 20 are covered with a diffuse reflecting layer 20a that reflects an incident light by diffusion. This design allows the light issued from the light sources 22 to be incident on the collimating plate 18 while being scarcely absorbed by the inner surfaces of the housing 20 whereupon the collimated light having a high luminance can be issued.

The diffuse reflecting layer 20a is not limited in any particular way and any known type can be used as exemplified by one that is formed by firstly preparing a paint in which fine particles of a light diffusing material such as alumina ($Al_2O_3$), titanium oxide ($TiO_2$) or the like are dispersed and then applying the paint to the inner surfaces of the housing 20.

The housing 20 contains the light sources 22. All known types of the light sources that are used in the so-called transmission type LCDs can be used as the light sources 22 as long as they issue adequate quantities of light.

The collimating plate 18 condenses the light issued from the light sources 22 and the light reflected by the inner surfaces of the housing 20 to produce the collimated light and then issue the resultant collimated light. Having this capability, the collimating plate 28 is placed such that it closes the opening of the housing 20.

Figure 2:
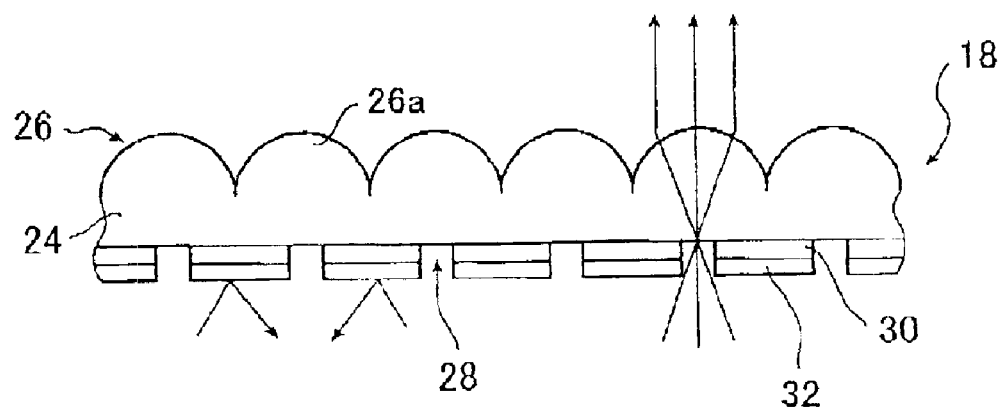
FIG. 2 is a cross sectional view that shows in conceptual form an embodiment of a collimating plate for use in a liquid crystal apparatus shown in FIG. 1.

The collimating plate to be used in the present invention is not limited in any particular way and various known types of collimating plates such as a collimating plate consisting of two prism sheet lenses and the like may be used. A preferred embodiment of the collimating plate 18 is schematically shown in FIG. 2.

The collimating plate 18 comprises a lens substrate 24 in plate form having a microlens array (hereinafter referred to as lens array) 26 formed on one side as a two-dimensional arrangement of a multitude of hemispherical microlenses 26a.

The surface of the side of the lens substrate 24 away from the lens array 26 is entirely covered with a light shield layer 30 except in light entrance areas 28 that are set on-axis or in alignment with the optical axes of the microlenses 26a. The surface of the side, which is also a light entrance side, of the lens substrate 24 is entirely covered also with a diffuse reflecting layer 32 except in the light entrance areas 28.

As will be distinct from the description below, the collimating plate 18 has basically the same construction as the light diffusing plate of the present invention to be described below in detail except that an anti-reflective layer 48 is replaced by the diffuse reflecting layer 32, The collimating plate 18 is fixed on the housing 20 with the side of the lens array 26 facing the liquid crystal panel 12.

As schematically shown in FIG. 2, the light issued from the housing 20 is launched into the lens substrate 24 via the light entrance areas 28, passes through, is launched into the microlenses 26a, refracted, condensed and issued as collimated light.

The light incident on other area than in the light entrance areas 28 is reflected by the diffuse reflecting layer 32 while being scarcely absorbed, goes back to the housing 20, by the diffuse reflection layer 20a of which it is reflected to make another entry into the collimating plate 18 and increases the efficiency of light utilization thereby issuing a collimated light having a a high luminance. Any light passing through the diffuse reflecting layer 32 is blocked by the light shield layer 30 so that no stray light which can reduce the directivity of the collimated light will be generated.

A preferred example of the collimating plate other than the illustrated collimating plate 18 is one that replaces the hemispherical microlenses 26a with a multitude of light-transmissive spherical beads which are fixed in one layer on a transparent base sheet in such a way that they partly contact the base sheet.

As already mentioned, the collimated light issued from the backlight section 14 is launched into the liquid crystal display panel (hereinafter referred to as display panel) 12.

In the display apparatus 10 of the present invention, the display panel 12 is a known liquid crystal display panel used in various kinds of LCDs. As an embodiment, illustrated is the display panel 12 in which a liquid crystal layer is sandwiched between two glass substrates, with a polarizer plate provided on each face of both glass substrates away from the liquid crystal layer. Various kinds of optical compensating films such as a phase compensating film and the like may optionally be provided between the glass substrate and the polarizer plate.

The display panel 12 may therefore be of a full-color or monochromatic type and has no limitations on the type of liquid crystal, liquid crystal cell, drive device (switching device) such as a TFT (thin-film transistor), black matrix (BM) and the like.

The display panel 12 may be operated in all known modes including a TN (twisted nematic) mode, an STN (supertwisted nematic) mode, an ECB (electrically controlled birefringence) mode, an IPS (in-plane switching) mode, an MVA (multi-domain vertical alignment) mode and the like.

As the light launched into the display panel 12 passes therethrough, it becomes an image-bearing light and is diffused by the light diffusing plate 16 to produce image display to the viewer. It has already been mentioned that one can increase the range of viewing angles of an LCD by using collimated backlight, namely, the collimated light as the backlight, and diffusing an image-bearing collimated light which has passed through the display panel 12 by means of the light diffusing plate 16. On this occasion, in the display apparatus 10, the light diffusing plate 16 may be the light diffusing plate of the present invention.

Figure 3A:
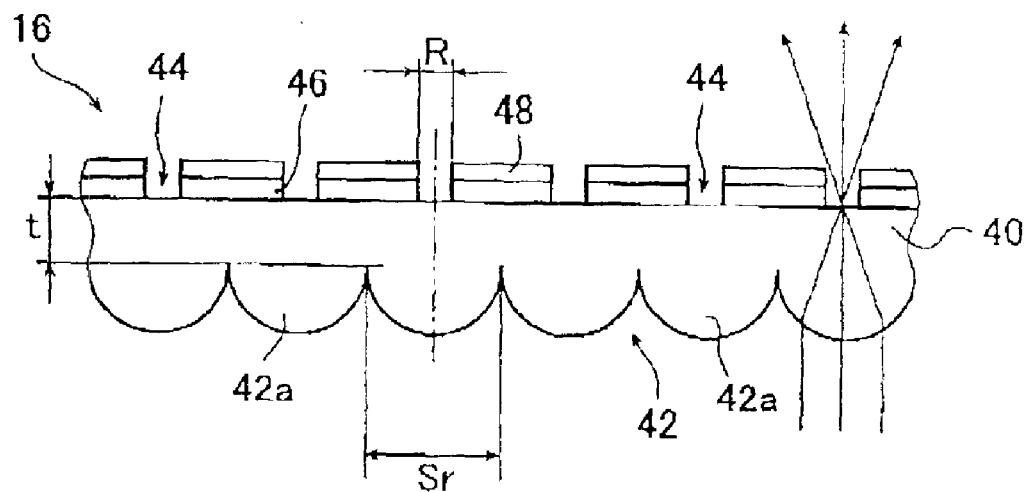
FIG. 3A is a cross sectional view that shows in conceptual form an embodiment of a light diffusing plate of the present invention.

FIG. 3A schematically shows the light diffusing plate 16 of the first aspect of the present invention.

As shown in FIG. 3A, the light diffusing plate 16 comprises a lens substrate 40 in plate form having a microlens array (hereunder referred to as a lens array) 42 formed on one side as a two-dimensional arrangement of a multitude of hemispherical microlenses 42a.

The surface of the side of the lens substrate 40 away from the lens array 42 is entirely covered with a light shield layer 46 except in circular light exit areas 44 that are set on-axis or in alignment with the optical axes of the microlenses 42a. The surface of the side of the lens substrate 40 which is closer to the viewer's eyes than the light shield layer 46 is entirely covered with an anti-reflective (AR) layer 48 except in the light exit areas 44.

The light diffusing plate 16 is fixed with the side of the lens array 42 facing the display panel 12.

Figure 3B:
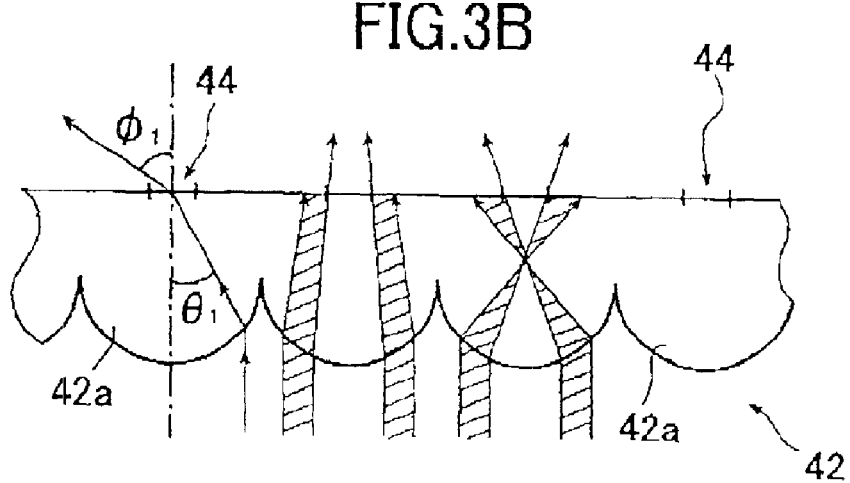
FIG. 3B shows in conceptual form how a light diffusing plate of the present invention works.

The image-bearing collimated light which has passed through the display panel 12, as schematically shown in FIGS. 3A and 3B, is launched into the microlenses 42a where it is refracted, passes them and the lens substrate 40 through, is further reflected at an interface between the lens substrate 40 and the light exit areas 44 and is issued from the light exit areas 44 as diffused light to display the image.

On this occasion, since the light diffusing plate 16 of the present invention is entirely covered with the light shield layer 46 except in the specified light exit areas 44, any stray light which has not appropriately been incident on the light exit areas 44 is neither issued unnecessarily nor launched into the display panel 12 again whereupon reduction of recognizability, an uneven display, a blurred image and the like to be caused by the stray light will not be generated.

As a preferred embodiment, the anti-reflective layer 48 is formed on top (viewing side) of the light shield layer 46 to produce the image display having a high contrast over a wide range of viewing angles without contrast deterioration and the like to be caused by mirroring external light and the like.

Constituent materials of the lens substrate 40 and the lens array 42 in such light diffusing plate 16 are not limited in any particular way and various types of lens materials such as glass, various types of optical resins and the like may be used. The lens substrate 40 and the lens array 42 may be molded monolithically or they may be separate members that are fixed in combination. It should also be noted that refractive index of the lens substrate 40 is not limited in any particular value but is preferably between 1.4 and 2 from the standpoint of light diffusing capability and the like.

According to the present invention (inclusive of an aspect in which the light exit areas are rectangular), the microlenses 42a need not be hemispherical and they may advantageously take on a shape produced by cutting a sphere by means of a plane which does not pass through the center thereof (smaller one of the resultant spherical crown form) or an ellipsoid (of revolution) through a plane perpendicular to its major axis (smaller one of the resultant cut products).

Further, according to the present invention (inclusive of an aspect in which the light exit areas are rectangular), the side of the microlens 42a which in Closer to the incoming light (interface between microlens 42a with lens substrate 40), namely, the microlens 42a viewed from a direction of the optical axis need not be circular and it may take on various shapes which are rectangular, hexagonal and the like.

The light shield layer 46 and the anti-reflective layer 48 are not limited in any particular way and various known types may be used. For example, the light shield layer 46 may be made of paint containing carbon black, chromium (Cr) or the like which is used in the BM of the display panel 12 while the anti-reflective layer 48 may be made of magnesium fluoride ($MgF_2$).

The methods of forming the light shield layer 46 and the anti-reflective layer 48 are not limited, either and they may be formed by any known methods such as a method of preparing and applying paint to form each layer, thin-film forming techniques (e.g. vapor deposition), printing and the like, the choice of which depends on constituent materials and other factors.

When these layers are formed by paint or thin-film techniques, the light exit areas 44 may be formed by a known method, such as application of a mask produced by a known method. The mask may be produced by self-alignment using photoresist or the like making use of microlens 42a.

Thickness of either one of the light shield layer 46 and the anti-reflective layer 48 is not limited in any particular way and it may be of any value as long as it can show a required light shielding capability and anti-reflective capability. Attention should be paid to that, when the thickness becomes too large, the light issued from the light exit areas 44 enters into both of the layers whereupon the light is blocked to cause a reduction of efficiency.

Figure 5:
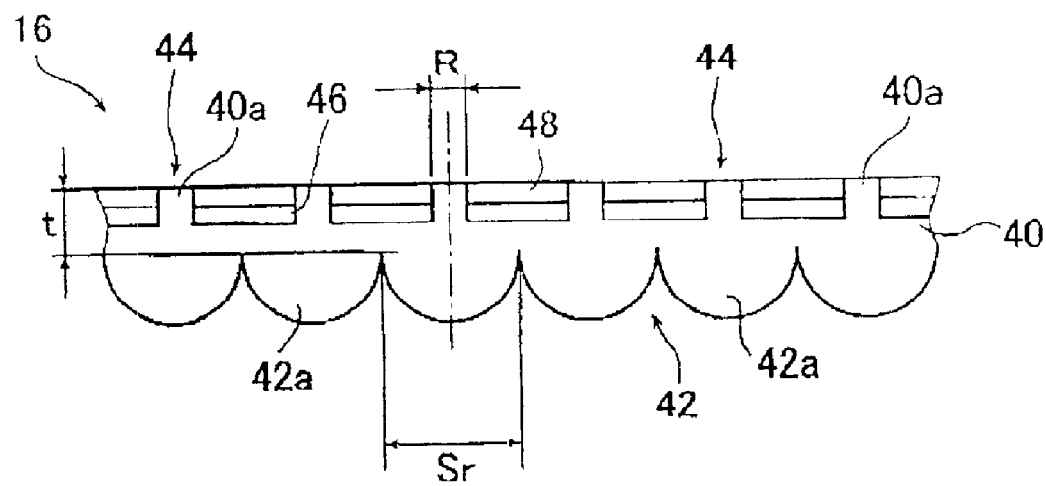
FIG. 5 is a cross sectional view that shows in conceptual form another embodiment of a light diffusing plate of the present invention.

In the embodiments shown in FIGS. 3A and 3B, the side of the lens substrate 40 away from the lens array 42 is flat and the light exit areas 44 are set on this side; however, the present invention is not limited to the above configurations and, as shown in FIG. 5, protrusions 40a may be provided on the side of the lens substrate 40 away from the lens array 42 whereupon end surfaces of the protrusions may become respective light exit areas 44.

Such protrusions 40a may be produced by a known forming method.

Figure 4:
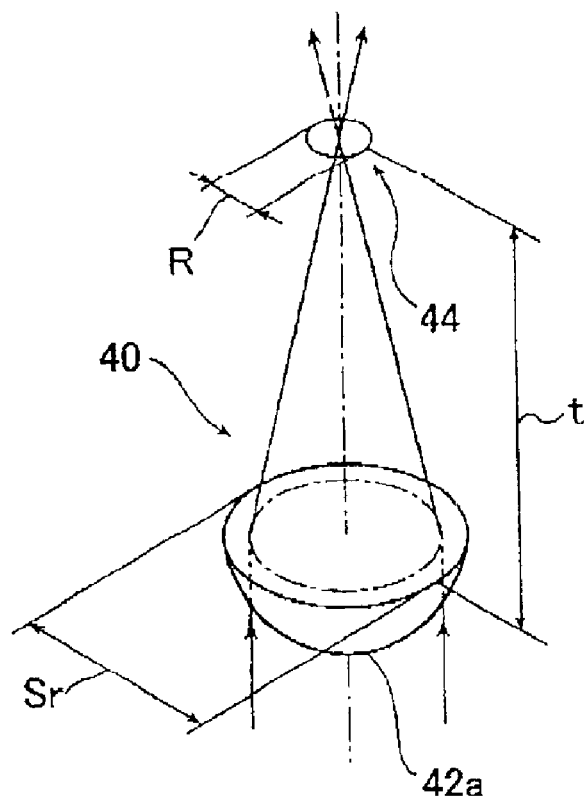
FIG. 4 is a perspective view that shows in conceptual form a microlens for illustrating a light diffusing plate of the present invention.

In the light diffusing plate 16 of the present invention, as shown in FIGS. 3A, 3B and 4, if the refractive index of the lens substrate 40 is written as n, the thickness of the lens substrate 40 (distance from the side thereof closer to the light exit areas 44 to the microlens 42a) as t, the diameter of the light exit areas 44 as R, the size of the microlens 42a as Sr (in the illustrated cases, the microlens 42a is hemispherical so that the size is given as the diameter of a corresponding sphere), the following relation is satisfied:

$$Sr \geq 2t \times \tan \theta + R \text{ (with proviso that } \theta = \sin^{-1}(1/n))$$

As shown in FIG. 3B, the collimated light launched into the microlens 42a is refracted in accordance with the refractive index n of the microlens 42a, advances at an angle of $\theta_1$ relative to the optical axis, reaches the surface of the side of the lens substrate 40 away from the microlens, is refracted again and is then issued at an angle of $\phi_1$.

On this occasion, as shown in a shaded area in FIG. 3B, when the incident collimated light is either greatly or slightly refracted by the microlens 42a and then launched into other portions than the light exit areas 44, the thus launched collimated light is blocked by the light shield layer 46 and a quantity of light to be issued, namely, display luminance, is reduced thereby causing contrast degradation.

The collimated light which is launched into a given position of the microlens 42a and then refracted, as described above, advances in the direction of the optical axis of the microlens 42a at the angle of $\theta_1$.

On this occasion, centers of the light exit areas 44 are set on-axis or in alignment with the optical axes of the microlens 42a, respectively. Therefore, a distance of the light which is launched into a given position of the microlens 42a and then refracted in the direction perpendicular to the optical axis in the light exit areas 44 can be calculated by the relation: $t \times \tan \theta_1$ and, when the distance is within the range of $t \times \tan \theta_1 \pm R/2$, the collimated light launched into the microlens 42a is emitted into corresponding light exit area 44.

Namely, it is important to appropriately set the size Sr of the microlens 42a, the thickness t of the lens substrate and the diameter R of the light exit area 44, in order to effectively issue the image-bearing collimated light which has been launched into the light diffusing plate 16 as the diffused light. By satisfying the relation: $Sr \geq 2t \times \tan \theta + R$, the collimated light which has been launched into the microlens 42a can appropriately be issued from corresponding light exit area 44, in accordance with setting of the size Sr, the thickness t and the like.

On this occasion, in the present invention, $\theta$ is the same as the maximum angle to which the light launched into a formed material of the lens substrate 40 is refracted in accordance with a quality of the material (medium), namely, it can be calculated in accordance with Snell laws of refraction: $\theta = \sin^{-1}(1/n)$ (wherein n indicates refractive index of medium).

Take, for example, the case that the formed material of the lens substrate 40 is an acrylic material. Since the refractive index n thereof is 1.40, $\theta$ becomes 42.16°.

Therefore, according to the present invention, the image-bearing collimated light which has been launched into the light diffusing plate 16 is not blocked unnecessarily enabling it to be appropriately issued without wasting it as the diffused light. Accordingly, the image display having a high luminance can be performed, as well as an image display having a high contrast over a wide range of viewing angles can be performed.

It has already been described that the existence of the light shield layer 46 prevents the unevenness of the display So be caused by the stray light and the existence of the anti-reflective layer 48 prevents contrast degradation to be caused by mirroring the external light.

In the present invention, it is certainly advantageous from the standpoint of efficiency, luminance or the like that the light launched into the microlens 42a is issued from the light exit areas 44 as much as possible. For this purpose, it is most preferable that the size Sr is the same as $2t \times \tan \theta + R$. However, in this case, there exists possibility of generation of the stray light so that it is necessary to give some margin to it.

Therefore, it is preferable that the size Sr is allowed to be a little larger than, but almost the same as the relation, $2t \times \tan \theta + R$, so that the microlens 42a can maximally be utilized to issue the diffused light in an extremely efficient manner.

For example, when the lens array 42 and the lens substrate 40 are molded monolithically and their molding materials are acrylic (n=1.49), the thickness t of the lens substrate 40 is 60 $\mu$m and the diameter R of the light exit areas 44 is 10 $\mu$m, the size Sr of the microlens 42a may be 98.9 $\mu$m or larger. Namely, for example, by setting the size Sr as 100 $\mu$m, the diffused light having a high luminance can efficiently be issued.

Alternatively, in contrast, at least one of the thickness of the lens substance 40 and the diameter R of the light exit areas 44 may be selected or adjusted in accordance with the size Sr of the microlens 42a.

Figure 6:
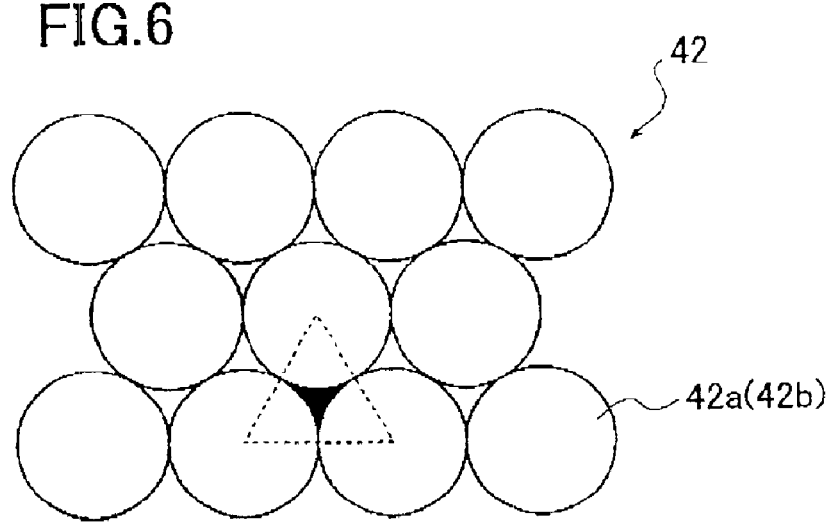
FIG. 6 is a plan view that schematically shows an embodiment of a microlens array for use in a light diffusing plate of the present invention.

In the present embodiment (the light exit area 44 is circular), it is preferable that, as shown in FIGS. 3A and 3B, the shape of the surface of the microlens 42a into which the light is launched (shape of microlens viewed from optical direction) is circular and, as schematically shown in FIGS. 3A, 3B and 6, microlenses 42a are arranged all over the surface of the lens substrate 40 in a maximum density state, in other words, the microlenses 42a are arranged in a closest packing state.

By taking these designs, the area which can not issue the diffused light is only a gap among microlenses 42a which is shown as an area filled in black in FIG. 6 and, therefore, the ratio between the area of the surface of the microlens 42a into which the light is launched and the area of the lens substrate 40, namely, the ratio of the area of the surface into which the light is launched against the area of the lens substrate 40 can be brought to be 90.7% ($=\pi/(2\times[3^{1/2}])$) maximally thereby allowing to obtain a more efficient light diffusing plate.

Figure 7A:
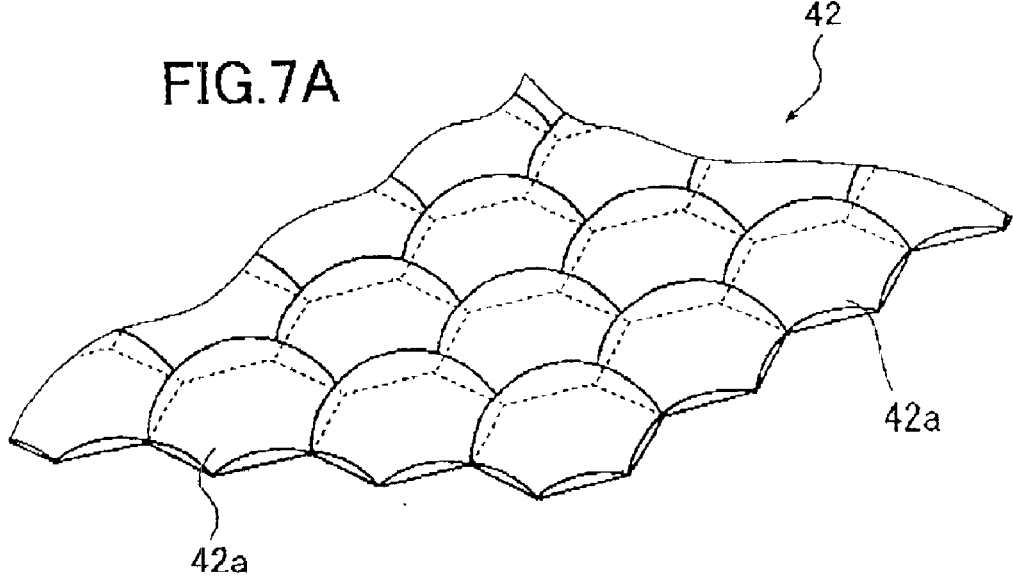
FIG. 7A is a perspective view that schematically shows another embodiment of a microlens array for use in a light diffusing plate of the present invention.
Figure 7B:
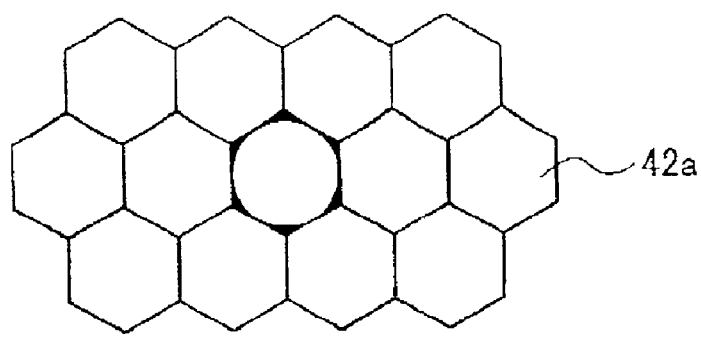
FIG. 7B is a plan view that schematically shows the embodiment shown in FIG. 7A.

Alternatively, in the present embodiment, it is also preferable that the shape of the surface into which the light is launched is set as being hexagonal as described above, and, as schematically shown in FIGS. 7A and 7B, the microlenses 42a in spherical crown form are arranged in a hexagonal close-packed structure (honeycomb structure).

By taking this structure, the area which can not issue the diffused light is only an area outside of a circle inscribed in this hexagonal form which is shown as an area filled in black in FIG. 6 and, therefore, the ratio of the areas of the surface into which the light is launched and the surface of the lens substrate 40 can be brought to be 90.7% ($=3^{1/2}\pi/6$) maximally thereby allowing to obtain a more efficient light diffusing plate.

In the present embodiment, in the case that the surface into which the light is launched is circular, the size Sr of the microlens 42a is the diameter thereof, whereas in the case that the surface into which the light is launched is not circular, the size Sr of the microlens 42a is the diameter of the circle inscribed in the form of the surface into which the light is launched.

In the above-described embodiment, the light exit areas 44 are circular whereas the light diffusing plate according to the second embodiment of the present invention has rectangular light exit areas.

In this light diffusing plate, if the length of one side of the rectangular light exit area is written as A, the length of another side of the rectangular light exit area as B, the size of the microlens in a direction corresponding to the side having the above-described length A as Sa, the size of the microlens in a direction corresponding to the side having the above-described length B as Sb, other factors than the above-described factors are the same as in the previous embodiment, the following relations are satisfied:

$$Sa \geq 2t \times \tan \theta + A; \text{ and}$$

$$Sb \geq 2t \times \tan \theta + B$$

Also in this embodiment, the center (intersection point of diagonal lines of the rectangle) of the rectangular light exit area is set on-axis or in alignment with the optical axis of the corresponding microlens.

Further, the sizes Sa and Sb of the microlens are lengths of respective sides of the rectangle inscribed in the form of the surface of the microlens into which the light is launched; the sides of the microlens are in the same direction (in the direction of rotation around the optical axis) as those of the light exit area; the ratio of two adjacent sides of the microlens is the same as that of the light exit area. Namely, when the light exit area is square (A=B), the size of the microlens is the length of a side of a square inscribed in the form of the surface of the microlens into which the light is launched in the same direction as the light exit area. Further, when the light exit are is rectangular (A≠B), the size of the microlens is the length of the side of the rectangle inscribed in the form of the surface of the microlens into which the light is launched, being in the same direction as that of the light exit area and, further, having the same ratio of the long and short sides as that of the light exit area.

In the same way as in the above-described first embodiment, according to such a light diffusing plate of the second embodiment of the present invention, the collimated light launched into the light diffusing plate is not blocked unnecessarily, can appropriately be issued as a diffused light without wasting it and implements a high contrast image display over a wide range of viewing angles while performing an image display having a high luminance.

This light diffusing plate basically has the same constitution as that of the above-described light diffusing plate having a circular light exit area except that the form of the light exit area of this light diffusing plate is rectangular so that different components will mainly be explained below.

Figure 8:
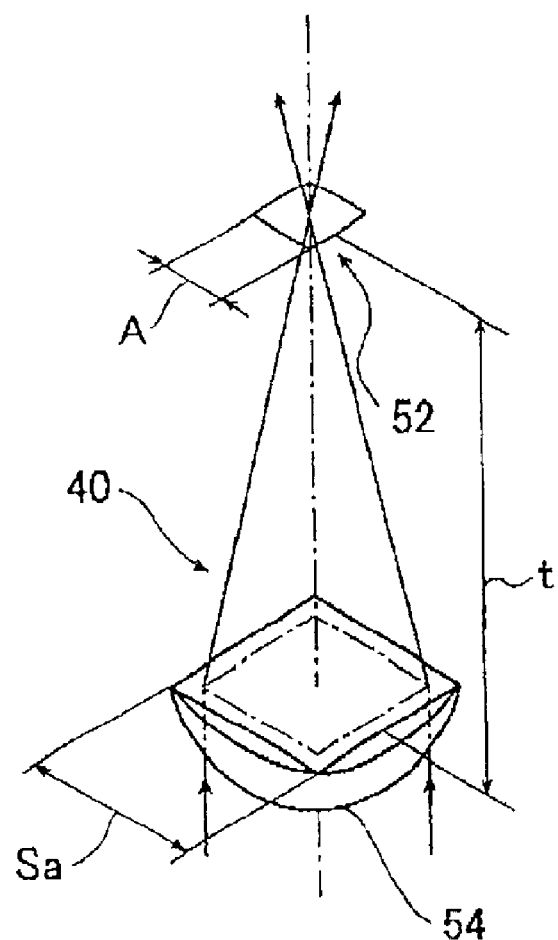
FIG. 8 is a perspective view that shows in conceptual form a microlens for illustrating an embodiment of a light diffusing plate of a second aspect of the present invention.

FIG. 8 schematically shows an embodiment of the light diffusing plate having the light exit area 52 in square form.

In the present embodiment, the microlens 54 is in spherical crown form obtained by cutting a sphere by means of a surface which does now pass through the center thereof; the form of the surface into which the light is launched (the form of the microlens viewed from the direction of the optical axis thereof) is square in the same direction as that of the light exit area 52.

On this occasion, in the light diffusing plate, lengths of sides of the light exit area 52 are in the relation of A=B so that the lengths of the microlenses are in the relation of Sa=Sb. Namely, in the present embodiment, if the relation: Sa≧2t× tan θ+A is satisfied, the size 3a is preferably the same as or a little larger than 2t×tan θ+A in the same way as in the previous embodiment.

Figure 9:
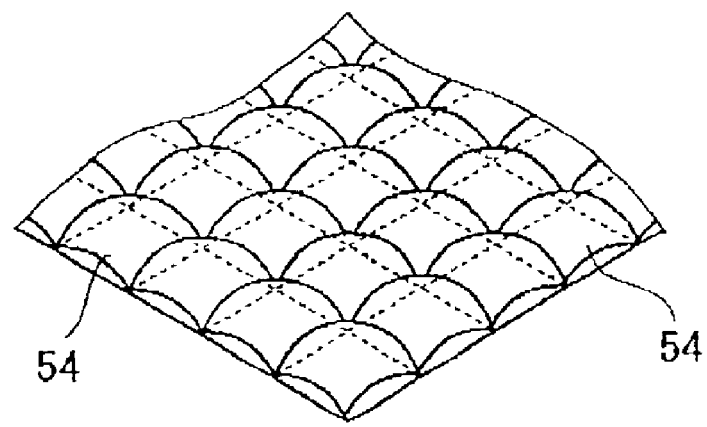
FIG. 9 is a perspective view that schematically shows an embodiment of a microlens array for use in the light diffusing plate shown in FIG. 8.

In the light diffusing plate having a square light exit area 52, it is preferable that the form of the surface of the microlens 54 into which the light is launched is square in the same direction as that of the light exit area 52 and the microlenses 54 are arranged in a square close-packed structure, as shown in FIG. 9.

By taking this configuration, the ratio of the surface into which the light is launched relative to the lens substrate 40 can be brought to as close as 100% at a maximum thereby obtaining an extremely efficient light diffusing plate.

Figure 10:
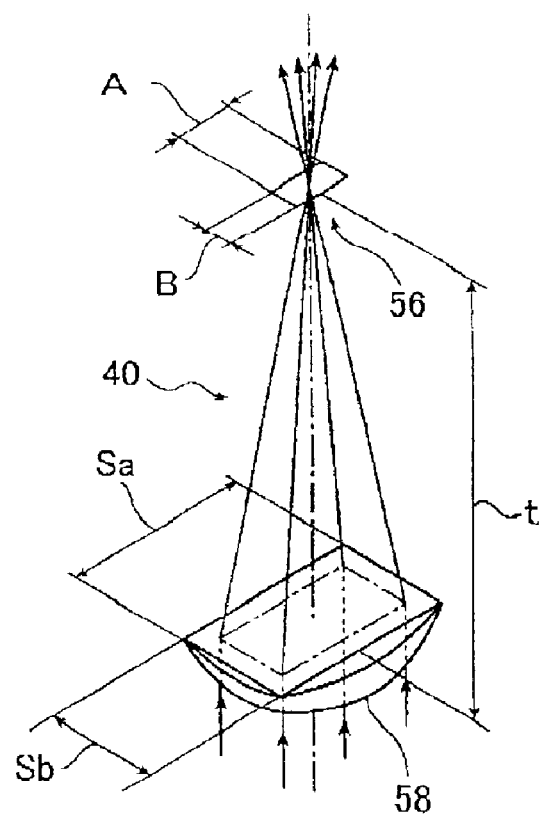
FIG. 10 is a perspective view that shows in conceptual form a microlens for illustrating another embodiment of a light diffusing plate of a second aspect of the present invention.

FIG. 10 schematically shows an embodiment having a rectangular light exit area.

In the present embodiment, a microlens 58 is in spherical crown form obtained by cutting a sphere by means of a surface which does not pass through the center thereof and the form of the surface thereof into which the light is launched (form of the microlens viewed from the direction of the optical axis thereof) is rectangular having the same ratio of a long side to a short side in the same direction as those of a light exit area 56. When, for example, the length of a long side of the light exit area 56 of the microlens 58 is written as A, the length of the short side thereof as B, the size of the light exit area 56 of the microlens 58 in the direction of the long side as Sa, the size thereof in the direction of the short side as Sb and the other components as the same as in the previous embodiment, two above-described relations are satisfied. Further, it is also preferable as in the previous embodiment that the sizes Sa and Sb are the same as or a little larger than 2t×tan θ+A and 2t×tan θ+B, respectively.

In the light diffusing plate having a rectangular light exit area 56, it is preferable that the form of the surface of the microlens 58 into which the light is launched is of a rectangle which has the same ratio of the long side to the short side as that of the light exit area 56 and is in the same direction as that of the light exit area 56 and the microlenses 58 are arranged in a rectangular close-packed structure in a similar manner to that shown in FIG. 9.

Taking this configuration, the ratio of the surface into which the light is launched relative to the lens substrate 40 is brought to as close as 100% at a maximum thereby obtaining an extremely efficient light diffusing plate.

On this occasion, in the display apparatus 10 according to the present invention, as the light diffusing plate 16, a light diffusing plate 17 according to a third embodiment of the present invention can be used.

Figure 11A:
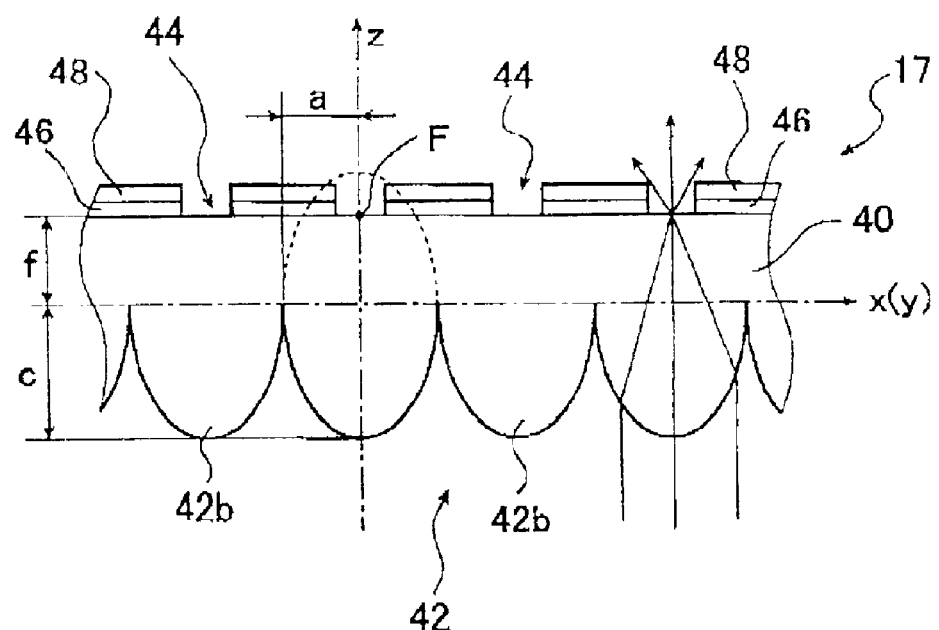
FIG. 11A is a cross sectional view that shows in conceptual form an embodiment of a light diffusing plate of a third aspect of the present invention.

FIG. 11A schematically shows the light diffusing plate 17 according to the third embodiment of the present invention.

The light diffusing plate 17 according to the third embodiment of the present invention as shown in FIG. 11A and the light diffusing plate 16 according to the first embodiment of the present invention as shown in FIG. 3A are the same except that the form of the microlens 42a of the microlens array 42 of the former is hemispherical whereas that of the microlens 42b of the microlens array 42 of the latter is semielliptic so that the same numerals as used in the light diffusing plate 16 are used to denote the same components in the light diffusing plate 17 and the detailed description thereof is omitted.

As shown in FIG. 11A, the light diffusing plate 17 comprises a lens substrate 40 in plate form having a microlens array 42 formed on one side thereof as a two-dimensional arrangement of a multitude of microlenses 42b, in a similar way to that in the light diffusion plate 16. As shown in the illustration, the microlens 42b are in hemielliptic form derived from cutting an ellipse by means of a surface perpendicular to one axis of the ellipse at the center thereof. The form of the microlens 42b will be described in detail below.

The light diffusing plate 17 is fixed to the display apparatus 10 with the side of the lens array 42 facing the display panel 12.

Figure 11B:
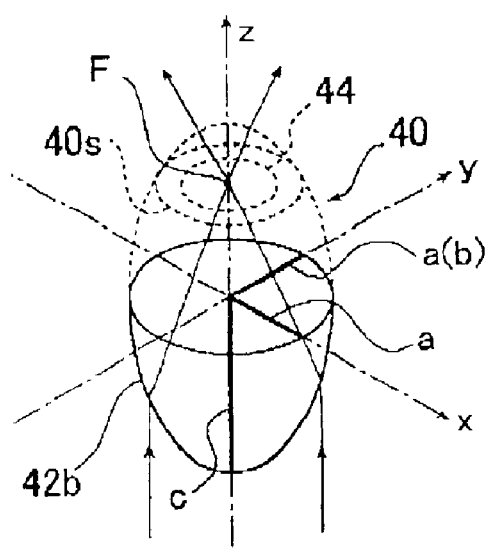
FIG. 11B is a perspective view in conceptual form for illustrating an embodiment of a microlens of a light diffusing plate of a third aspect of the present invention.

The image-bearing collimated light which has passed through the display panel 12, as schematically shown in FIGS. 11A and 11B, is launched into the microlenses 42b where it is retracted, passes them and the lens substrate 40, is further refracted at an interface between the lens substrate 40 and the light exit areas 44 and is issued from the light exit areas 44 as diffused light to display the image. How the light diffusion is operated will be described below.

Since the light diffusing plate 17 of the present invention is entirely covered with the light shield layer 46 except in the specified light exit areas 44 in the same way as the light diffusing plate 16, any stray light which was not appropriately incident on the light diffusing plate 17 neither issued unnecessarily nor launched into the display panel again whereupon reduction of recognizability, an uneven display, a blurred image and the like to be caused by the stray light will not be generated. As a preferred embodiment, the anti-reflective layer 48 is formed on top (viewing side) of the light shield layer 46 to produce the image display having a high contrast over a wide range of viewing angles without contrast degradation and the like to be caused by mirroring the external light and the like.

Figure 12:
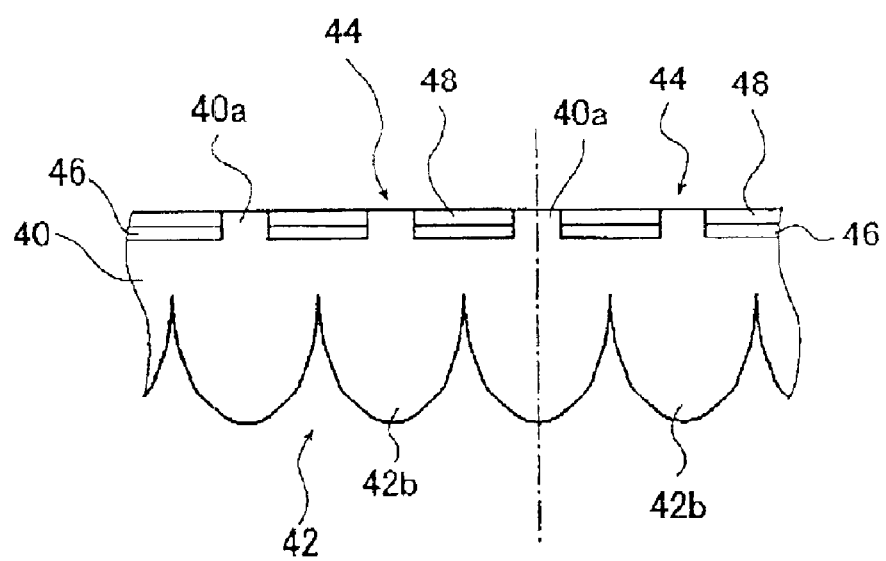
FIG. 12 is a cross sectional view that shows in conceptual form another embodiment of a light diffusing plate of a third aspect of the present invention.

In the illustrations shown in FIGS. 11A and 11B, the surface of the side of the lens substrate 40 away from the lens array 42 is flat on which the light exit areas 44 are provided; however, the present invention is not limited to this structure and, as shown in FIG. 12, an protrusion 40a may be provided on the surface of the side of the lens substrate 40 away from the lens array 42 to allow an end surface of the protrusion 40a to be the light exit areas 44. The protrusion of this kind may be produced by a known molding method.

In the light diffusing plate according to the present embodiment, as shown in FIGS. 11A and 11B, when a direction of a substrate surface 40 is indicated by x axis and y axis; a direction of an optical axis (a direction of a normal line of the lens substrate 40) by z axis, the form of the microlens 42b is a part of an ellipsoid in which the optical axis and the z axis are coincident with each other as shown in the following formula (1) and, further, when the refractive index of a material to form the microlens 42b is indicated by n, an eccentricity ϵ of the ellipsoid is shown by the following formula (2):

$$X^2/a^2+y^2/a^2+z^2/c^2=1 \quad (1)$$

$$\epsilon=(C^2-a^2)^{1/2}/c=1/n \quad (2)$$

Moreover, in this ellipsoid, a focal point F located farther than the other, that is, far focal point from the side in which the light is launched (a focal point nearer to the side from which the light is issued) falls on the light exit area 44, namely, the far focal point F is set on, coincident with or in alignment with a surface 40s of the lens substrate 40 away from the microlens 42b.

As is well known, the form of the ellipsoid is shown by the following general formula:

$$x^2/a^2+y^2/b^2+z^2/c^2=1$$

The accentricity of the ellipse is shown by the following general formula:

$$\epsilon=(a^2-b^2)^{1/2}/a$$

Therefore, an accentricity $\epsilon_{x-z}$ and a focal point position $f_{x-z}$ of an x-z plane of the above-described ellipsoid are shown by following respective formulae:

$$\epsilon_{x-z}=(c^2-a^2)^{1/2}/c$$

$$f_{x-z}=c\times\epsilon_{x-z}$$

While, an accentricity $\epsilon_{y-z}$ and a focal point position $f_{y-z}$ of a y-z plane thereof are shown by following respective formulae:

$$\epsilon_{y-z}=(c^2-b^2)^{1/2}/c$$

$$f_{y-z}=c\times\epsilon_{y-z}$$

On this occasion, as shown by an arrow in FIG. 11B, when the accentricity is the reciprocal number of the refractive index n of the lens forming material, the light which has been launched from outside and is in parallel with the optical axis is converged on the focal point F and then diffused.

Further, in the ellipsoid, in the case of "$\epsilon_{x-z}=\epsilon_{y-z}$", the focal point position $f_{x-z}$ in the direction of x-z is coincident with or in alignment with the focal point position $f_{y-z}$ in the direction of y-z.

Therefore, by allowing the length a in the direction of the x axis and the length b in the direction of the y axis to be coincident with each other, namely a=b, in other words, by allowing the form of the ellipsoid to satisfy the relation: $X^2/a^2+y^2/a^2+z^2/c^2=1$ in which the distance thereof in the direction of the x axis or the y axis is 2a and the distance thereof in the direction of the z axis is 2c and, further, by allowing the accentricity ϵ of the ellipsoid to satisfy the relation: $\epsilon=(c^2-a^2)^{1/2}/c=1/n$, the light which has been launched into lenses and is in parallel with the optical axis is converged on a focal point (far focal point) located farther than the other from the side into which the light is launched and then diffused.

The light diffusing plate according to the present embodiment, being based on the above-described knowledge, can issue collimated light which is launched into the microlenses 42b as a well-diffused light by allowing the form of a plurality of the microlenses 42b arranged in number on a surface of the lens substrate 40 to be a part of the ellipsoid satisfying the above-described conditions and allowing the light exit areas 44 (namely, the surface 40s of the side of the lens substrate 40 away from the microlenses 42b) to be coincident with a focal point located farther than the other from the side into which the light is launched. Moreover, since the image-bearing collimated light basically is launched into the focal point F, the light is not blocked by the light shield layer 46 unnecessarily thereby issuing a diffused light having a high luminance.

Due to the above-described reasons, by using the light diffusing plate according to the present embodiment, in an LCD aiming at widening the range of viewing angles by means of the collimated backlight and the light diffusing plate, the image-bearing collimated light can substantially be diffused and issued in a high luminance manner whereupon the image having a high contrast can be displayed over a wide range of viewing angles.

Further, as has been already described above, since the above-described light diffusing plate comprises the light shield layer 46, the unevenness of the display or the like to be caused by the stray light does not occur and, moreover, since it also comprises the anti-reflective layer 48, degradation of the contrast to be caused by mirroring the external light does not occur.

Such light diffusing plate 17 according to the present invention may be formed, taking as an example, by making use of the relations:

$$a=[(n2-1)^{1/2}/n]\times c; \text{ and}$$

$$f=c/n$$

derived from the above-described formula.

For example, if the lens array 42 (microlenses 42b) and the lens substrate 40 are molded monolithically, the material to be used for molding is an acrylic compound (n=1.49) and c of the microlenses 42b is 50 μm, then the lens array 42 or the lens substrate 40 may be molded such that a of the microlenses 42b becomes 37.1 μm and f thereof becomes 33.6 μm.

The microlenses 42b are not limited to the hemiellipsoid form as illustrated, as long as they satisfy the above-described conditions but a form (a smaller portion) obtained by cutting an ellipsoid which satisfies the above-described conditions at a position other than the center position of the axis thereof may favorably be employable.

Further, the form of the surface of the microlenses 42b into which the light is launched (interface between the microlenses 42b and the lens substrate 40), namely, the form of the microlenses 42b viewed from the optical axis, is not limited to a circle but various forms, such as rectangle, hexagon and the like are employable.

In the present embodiment, as schematically shown in FIGS. 11B and 6, the microlenses 42b are preferably arranged such that, while the form of the surface of the microlenses 42b into which the light is launched is circular, the microlenses 42b are disposed over an entire surface of the lens substrate 40 in a maximum density, namely, a closest packing state.

By taking this configuration, the area which can not issue the diffused light is only a gap among microlenses 42a which is shown as an area filled in black in FIG. 6 and, therefore, the ratio between the area of the surface of the microlens 42b into which the light is launched and the area of the lens substrate 40 can be brought to be 90.7% ($=\pi/(2\times[3^{1/2}])$) to the maximum thereby allowing to obtain a more efficient light diffusing plate.

Figure 13A:
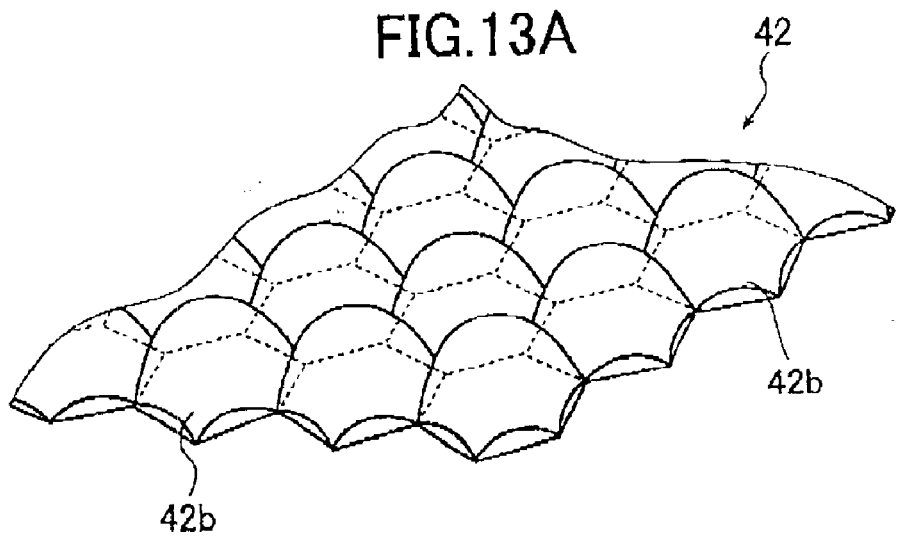
FIG. 13A is a perspective view that schematically shows an embodiment of a microlens array for use in a light diffusing plate of a third aspect of the present invention.
Figure 13B:
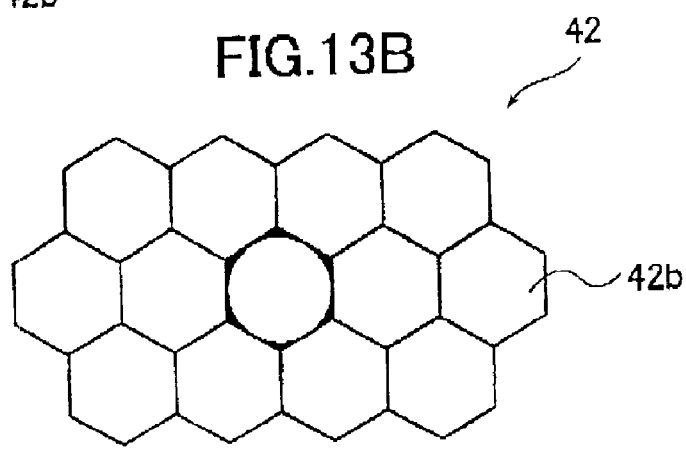
FIG. 13B is a plan view that schematically shows the embodiment shown in FIG. 13A.

Alternatively, it is also preferable that the form of the surface of the microlenses 42b into which the light is launched is set as being hexagonal and, as schematically shown in FIGS. 13A and 13B, the microlenses 42a are arranged in a hexagonal close-packed state (honeycomb state).

By taking this form, the area which can not issue the diffused light is only an area outside of a circle inscribed in this hexagon as shown by an area filled in black in FIG. 13B and, therefore, the ratio of the area of the surface into which the light is launched and the area of the surface of the lens substrate 40 can be brought to be 90.7% ($=3^{1/2}\pi/6$) to the maximum thereby allowing to obtain a more efficient light diffusing plate.

The form of the light exit areas 44 is not limited to a circle the center of which is set on or coincident with the optical axis (z axis) of the microlenses 42b but various forms may be permissible in accordance with the form of the surface into which the light is launched.

The size of the light exit areas 44 is not limited in any specific way. The smaller the size becomes, the more advantageous it becomes from the standpoint of the light diffusing capability in view of preventing the stray light, while, the larger size becomes, the more advantageous it becomes from the standpoint of utility efficiency. Therefore, the size of the light exit areas 44 may optionally be determined in accordance with an application or the size of the light diffusing plate, the size of the microlenses, required light diffusing capability, luminance (display luminance) of the diffused light and the like.

Figure 14:
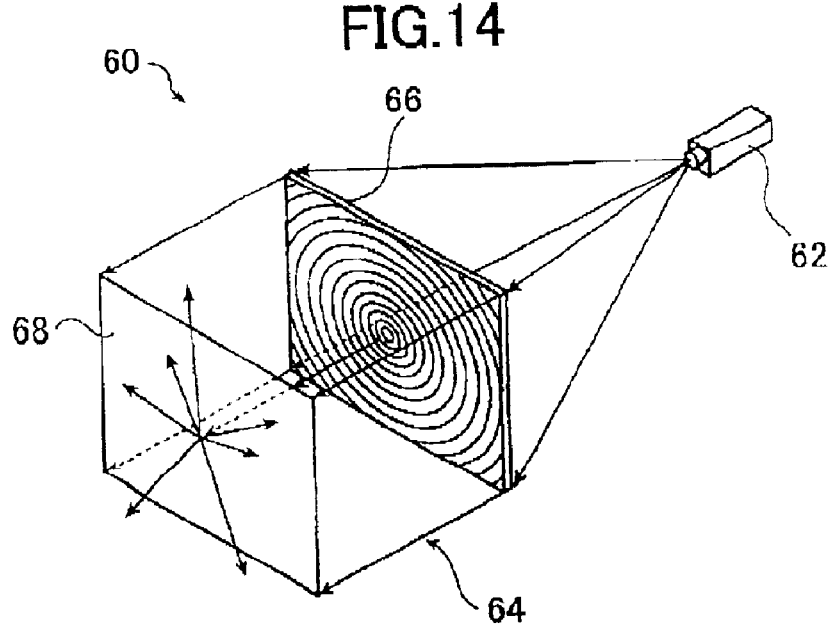
FIG. 14 is a perspective view that schematically shows an embodiment of a rear projection apparatus of the present invention.

While the above-shown illustrations are of the liquid crystal display apparatus according to the present invention making use of the light diffusing plate according to various embodiments of the present invention, a rear projection apparatus according to the present invention making use of various embodiments of the light diffusing plate according to the present invention is schematically shown in FIG. 14.

The rear projection apparatus 60 as shown in FIG. 14 has a rear projection engine which issues an image-bearing diffused light (hereinafter referred to simply as engine) 62 and a screen 64.

The screen 64 has a Fresnel lens 66 and a light diffusing plate 68 which is any one of the above-described light diffusing plates according to the first to third embodiments of the present invention. The diffused light issued from the engine 62 (diffused light being issued from a given point and having a directionality) is changed into a collimated light by the Fresnel lens 66 and, subsequently, the resultant collimated light is diffused by the light diffusing plate 68 to display an image on the screen 64. In the illustration shown in FIG. 14, the Fresnel lens 66 and the light diffusing plate 68 are shown apart from each other, but in practice these components are disposed adjacent to each other.

It has already been described that, in a conventional rear projection apparatus using a screen employing a lenticular lens, for example, can obtain a good viewing angle in a horizontal direction but can not obtain a sufficient viewing angle in a vertical direction.

In contrast, in the rear projection apparatus using the light diffusing plate 68 according to the present invention, the collimated light can favorably be diffused in all directions by the operation of the microlens array in which the microlenses having various forms such as the above-described hemispherical or hemielliptical form are disposed so that the image can be observed at a good viewing angle from any direction. Further, the light which has been launched can be issued without wasting it so that an image display having a high luminance is performed thereby enabling the image having a high contrast to be displayed over a wide range of the viewing angles.

As described above in detail, the light diffusing plate according to the first and second embodiments of the present invention not only can favorably diffuse the collimated light which has been launched but also can favorably block the stray light which has been launched through an inappropriate optical path and, further, can issue the collimated light which has been launched through an appropriate optical path with a favorable efficiency without blocking it, namely, can issue the diffused light having a high luminance.

As described above in detail, the light diffusing plate according to the third embodiment of the present invention can favorably diffuse the collimated light which has been launched and issue the resultant fully diffused light having a high luminance.

Further, the liquid crystal display apparatus and rear projection apparatus each using the light diffusing plate of each embodiment can display the image having a high luminance and high contrast over a wide range of viewing angles.

While the light diffusing plate, the liquid crystal display apparatus and the rear projection apparatus of the present invention have been described above in detail with reference to various embodiments, it should be understood that the present invention is by no means limited to the foregoing embodiments alone and various improvements and design modifications may of course be made without departing from the scope and spirit of the present invention.

What is claimed is:

1. A light diffusing plate comprising:
   a lens substrate;

a plurality of microlenses disposed on a surface of said lens substrate, into which collimated light is launched;

a plurality of light exit areas disposed on another surface of said lens substrate, from which diffused light is issued, each having a circular form a center of which is coincident with an optical axis of each of said plurality of microlenses;

a light shield layer formed on said another surface of the lens substrate reverse to said plurality of microlenses, and covering an area other than said plurality of light exit areas; and an anti-reflective layer formed on a surface of said light shield layer other than a surface formed on said light shield layer and covering the area other than said plurality of light exit areas wherein when a refractive index of said lens substrate is represented by n; a thickness of said lens substrate by t; a diameter of each of said plurality of light exit areas by R; and a size of each of said plurality of microlenses by Sr, the following formula is satisfied:

$Sr \geq 2t \times \tan \theta + R$ (with the proviso that $\theta = \sin^{-1}(1/n)$).

2. The light diffusing place according to claim 1, wherein said plurality of microlenses are either in circular form when viewed from a direction of the optical axis and are arranged in a closest packing state or in hexagonal form when viewed from the direction of the optical axis and are arranged in a hexagonal close-packed state.

3. The light diffusing plate according to claim 1, wherein said refractive index of said lens substrate is between 1.4 and 2.

4. The light diffusing plate according to claim 1, further comprising a plurality of protrusions provided on a side of said another surface of said lens substrate, wherein an end surface of each of said plurality of protrusions becomes each of said plurality of light exit areas.

5. The light diffusing plate according to claim 4, wherein said light shield layer and said anti-reflective layer are embedded among said plurality of protrusions.

6. A liquid crystal display apparatus comprising:

a liquid crystal display panel;

a backlight section for causing collimated light to be incident on said liquid crystal display panel; and a light diffusing plate for diffusing image-bearing collimated light which has passed through said liquid crystal display panel, wherein said light diffusing plate comprises a lens substrate;

a plurality of microlenses disposed on a surface of said lens substrate, into which said image-bearing collimated light is launched;

a plurality of light exit areas disposed on another surface of said lens substrate, from which diffused light to display an image is issued, each having a circular form a center of which is coincident with an optical axis of each of said plurality of microlenses;

a light shield layer formed on said another surface of the lens substrate reverse to said plurality of microlenses, and covering an area other than said plurality of light exit areas; and an anti-reflective layer formed on a surface of said light shield layer other than a surface formed on said light shield layer and covering the area other than said plurality of light exit areas wherein when a refractive index of said lens substrate is represented by n; a thickness of said lens substrate by t; a diameter of each of said plurality of light exit areas by R; and a size of each of said plurality of microlenses by Sr, the following formula is satisfied:

$Sr \geq 2t \times \tan \theta + R$ (with the proviso that $\theta = \sin^{-1}(1/n)$).

7. The liquid crystal display apparatus according to claim 6, wherein said backlight section comprises:

at least one light source;

a lamp housing for containing said at least one light source, whose inner surfaces are covered with a diffuse reflecting layer; and a collimating plate which comprises:

a lens substrate;

a plurality of microlenses disposed on a surface of said lens substrate, from which said collimated light is issued;

a plurality of light entrance areas disposed on another surface of said lens substrate, into which light issued from said at least one light source and reflected by the inner surfaces of said lamp housing is launched, each having a circular form a center of which is on an optical axis of each of said plurality of microlenses and set on said another surface of the lens substrate reverse to said plurality of microlenses;

a light shield layer formed n said another surface of said lens substrate reverse to said plurality of microlenses so as to cover an other area other than said plurality of light entrance areas; and a diffuse reflecting layer formed on a surface of said light shield layer at a light entrance side of said light shield layer so as to cover the area other than said plurality of light entrance areas.

8. A light diffusing plate comprising:

a lens substrate;

a plurality of microlenses disposed on a surface of said lens substrate, into which collimated light is launched;

a plurality of light exit areas disposed on another surface of said lees substrate, from which diffused light is issued, each having a circular form a center of which is coincident with an optical axis of each of said plurality of microlenses;

a light shield layer formed on said another surface of the lens substrate reverse to said plurality of microlenses, and covering an area other than said plurality of light exit areas; and an anti-reflective layer formed on a surface of said light shield layer other than a surface formed on said light shield layer and covering the area other than said plurality of light exit areas.

9. The light diffusing plate according to claim 8, further comprising a plurality of protrusions provided on a side of said another surface of said lens substrate, wherein an end surface of each of said plurality of protrusions becomes each of said plurality of light exit areas.

10. The light diffusing plate according to claim 9, wherein said light shield layer and said anti-reflective layer are embedded among said plurality of protrusions.

* * * * *